United States Patent
Parks (10) Patent No.: US 10,011,368 B1
(45) Date of Patent: Jul. 3, 2018

(54) AIRCRAFT STAIRCASE PROTECTION SYSTEM

(71) Applicant: The Boeing Company, Chicago, IL (US)

(72) Inventor: Rolf H. Parks, Bellingham, WA (US)

(73) Assignee: The Boeing Company, Chicago, IL (US)

( * ) Notice: Subject to any disclaimer, the term of this patent is extended or adjusted under 35 U.S.C. 154(b) by 1216 days.

(21) Appl. No.: 13/903,017

(22) Filed: May 28, 2013

(51) Int. Cl.
*B62D 63/04* (2006.01)
*B64D 45/00* (2006.01)

(52) U.S. Cl.
CPC ..................... *B64D 45/00* (2013.01)

(58) Field of Classification Search
CPC ...... B65D 81/3886; B65D 25/34; A61G 5/10; B62D 1/06; E04G 21/30; B64D 45/00
USPC ............ 150/154–167; 428/100, 102, 43, 77; 52/179, 182, 188, 189, 3; 182/106, 115, 182/127, 129, 206, 46; 472/116; D25/63, 64, 68, 582
See application file for complete search history.

(56) References Cited

U.S. PATENT DOCUMENTS

| | | | | |
|---|---|---|---|---|
| 2,551,345 A | * | 5/1951 | Scott | B63B 27/14 105/326 |
| 3,055,146 A | * | 9/1962 | Lobato | B28B 7/225 249/14 |
| 3,158,893 A | * | 12/1964 | Smith | A47G 27/0206 16/4 |
| 3,185,197 A | * | 5/1965 | Spiro | A47C 31/10 150/154 |
| 4,137,356 A | * | 1/1979 | Shoemaker | A47G 23/0303 248/346.11 |
| 4,564,108 A | * | 1/1986 | Widlund | A61F 13/5514 206/438 |
| 4,984,619 A | * | 1/1991 | Ellis | E06B 9/01 160/351 |
| 5,066,001 A | * | 11/1991 | Wilkinson | A63B 6/00 482/52 |
| 5,761,853 A | * | 6/1998 | Trosper | E04G 21/30 118/504 |

(Continued)

FOREIGN PATENT DOCUMENTS

FR       2752409 A1 *  2/1998  ............... B64C 1/24

OTHER PUBLICATIONS http://aerotape.com/shop/protex-10v/, published May 20, 2013.

(Continued)

*Primary Examiner* — Fenn C Mathew
*Assistant Examiner* — Cynthia Collado
(74) *Attorney, Agent, or Firm* — Ostrager Chong Flaherty & Broitman PC (57) ABSTRACT

A system and method for protecting an aircraft staircase having a plurality of steps positioned between two sides comprises a step cover configured to be removably coupled to the plurality of steps, a first side cover configured to drape over and be removably coupled to a first one of the sides, and a second side cover configured to drape over and be removably coupled to a second one of the sides, the step cover, the first side cover and the second side cover comprising a lightweight, flexible material. A hood is removably coupled to the first and second side covers or to the staircase to cover and temporarily block access to the staircase.

16 Claims, 9 Drawing Sheets

(56) References Cited

U.S. PATENT DOCUMENTS

| | | | | |
|---|---|---|---|---|
| 6,029,408 | A * | 2/2000 | Cavaness | E04F 11/025 52/182 |
| 6,056,347 | A * | 5/2000 | D'Adamo | B60J 11/00 296/136.02 |
| 6,640,501 | B1 * | 11/2003 | Hussey | E04G 21/30 428/77 |
| 8,334,041 | B2 | 12/2012 | Sweeney et al. | |
| 2008/0066389 | A1 * | 3/2008 | Siegel | A47G 27/0287 52/3 |
| 2009/0107763 | A1 * | 4/2009 | Poston, Jr. | E04F 11/16 182/106 |
| 2011/0072574 | A1 * | 3/2011 | Hsiang Lin | E04H 4/144 4/504 |

OTHER PUBLICATIONS http://www.fabtexinc.com/stock.html, published May 21, 2013.
http://www.batiflexbygerflor.com/, and Batiflex AV 135 product information, published May 21, 2013.
http://www.skandiaupholsterysupplies.com/products/DAX-Foam-DAX-90.html, published May 22, 2013.

\* cited by examiner

AIRCRAFT STAIRCASE PROTECTION SYSTEM

TECHNICAL FIELD

This disclosure generally relates to the protection of cosmetically sensitive parts in an aircraft and, more specifically, to systems and methods for protecting cosmetically sensitive parts of aircraft staircases during aircraft manufacture, installation of the staircase into an aircraft, and during maintenance or repair of the aircraft.

BACKGROUND

Aircrafts typically include one or more types of monuments, such as staircases and galleys. These monuments often include parts made from cosmetically sensitive material, such as stainless steel and chrome. Monuments are often fully assembled prior to installation into an aircraft. The cosmetically sensitive parts on the monuments may receive scratches, scuffs, dents or other types of damage during the installation process and aircraft assembly and maintenance.

For example, in larger aircraft with more than one deck, a staircase or stairway is installed to provide access from one deck to another. Staircases often include a plurality of steps positioned between two side rails including a hand rail. The steps may include a kick strip on the front side of the steps. One or both of the side rails may include an opening for stylistic purposes at least partially covered with a privacy screen made from an opaque material. The staircase is typically fully assembled by the manufacturer and shipped to the aircraft manufacturer for installation into the aircraft. In addition, staircases are typically installed into an aircraft prior to other monuments, and other parts or components of the aircraft, and are therefore accessible to damage during the remaining aircraft manufacturing or build process.

Because of the high cost of such staircases, and the high cost of repairing or replacing parts on the staircases, there is a need to protect the staircase when the aircraft is not in commercial service. In particular, there is a need for a low cost system and method that are readily accessible and provide protection for cosmetically sensitive parts during installation, repair or maintenance.

SUMMARY

The foregoing purposes, as well as others that will be apparent, are achieved generally by providing systems and methods for protecting cosmetically sensitive parts of an aircraft staircase. One aspect of the subject matter disclosed in detail below is a system for protecting an aircraft staircase having a plurality of steps positioned between two sides. The system comprises a step cover configured to be removably coupled to the plurality of steps, a first side cover configured to drape over a first one of the sides, and a second side cover configured to drape over a second one of the sides. The step cover, the first side cover and the second side cover are made from a flexible material. The first side cover and the second side cover are configured to be removably coupled to the step cover. A flexible hood may be removably coupled to the first side cover and the second side cover to cover the staircase and temporarily block access to the staircase.

Another aspect of the subject matter disclosed in detail below is a method for protecting an aircraft staircase having a plurality of steps positioned between two sides. The method comprises removably coupling a flexible step cover to the plurality of steps, placing a flexible first side cover over a first one of the sides, and placing a flexible second side cover over a second one of the sides. The first side cover and the second side cover may be removably coupled to the flexible step cover. The method may also include removably coupling a flexible hood to the first side cover and the second side cover to temporarily block access to the staircase.

A still further aspect of the disclosure is a staircase cover for covering an aircraft staircase and a method for covering an aircraft staircase wherein the staircase cover is wrapped around a handrail of the staircase and removably coupled to itself to temporarily block access to the staircase. The staircase cover comprises a flexible material configured with an elongated central portion sandwiched between enlarged end sections.

Other objects, features and advantages of the present disclosure will be apparent when the detailed description is considered in conjunction with the following drawings.

BRIEF DESCRIPTION OF THE DRAWINGS

The present disclosure will be hereinafter described with reference to drawings for the purpose of illustrating the foregoing and other aspects of the disclosure.

Reference will hereinafter be made to the drawings in which similar elements in different drawings bear the same reference numerals.

DETAILED DESCRIPTION

The following detailed disclosure describes an apparatus, system and method for protecting a staircase with reference to the drawings comprising a step cover, first and second side covers and a hood for encompassing the staircase like a cocoon. The apparatus, system and method may be used at manufacturing facilities, repair stations and/or service and maintenance facilities for covering the cosmetically sensitive parts of a staircase. The system and method utilize an apparatus made of lightweight and low cost materials that are easily folded and stored, making the system readily usable. It is easily installed over and removed from the cosmetically sensitive parts. It provides protection from bumps, dents, scratches and other types of damage. It uses disposable and/or recyclable materials that are compliant with industry standards. The total weight of the components of the protective system is approximately 40 lbs or less.

The step cover, the first and second side covers, and the hood may be made from any type of flexible material that provides protection from bumps, dents, scrapes, scuffs, scratches and the like. Preferred materials should be lightweight to promote ease of use, installation, removal, portability and storage, may be made from recyclable materials, and may be fire retardant and compliant with other aircraft material requirements. The material should have the ability to collapse (or fold) upon itself. The material may also be a bright color to ensure that staircase is highly visible when covered. An example of the type of material that may be used for all of the covers is a yellow nylon material such as Nylon Oxford Yellow Flame Retardant Coat, 200 Denier available from Fabtex, Inc., Laverne, Calif. Other materials with other properties may be used provided the material is flexible and may be positioned without bunching or sagging. For example, the material may be inexpensive to provide for disposability after use.

The step cover, the side covers and the hood may work together as a protection system. All are secured snugly on the staircase and to each other to avoid sagging. Any type of fastener that provides removable coupling may be used to secure the step cover, side covers and hood on the staircase and to each other, such as hook-and-loop fasteners, e.g., VELCRO®, snaps, buttons, ties and zippers. The fasteners may be provided on the covers and the hood in the protection system to provide secure easily removable attachment to each other and provide flexibility of the attachment system. For example, the hood may be easily removed to permit access to the steps and then re-installed to temporarily block access to the steps. The fasteners may have an adhesive backing for attachments to the step cover, side covers and hood, or may be attached with stitching, rivets or other suitable attachment means.

Figure 1:
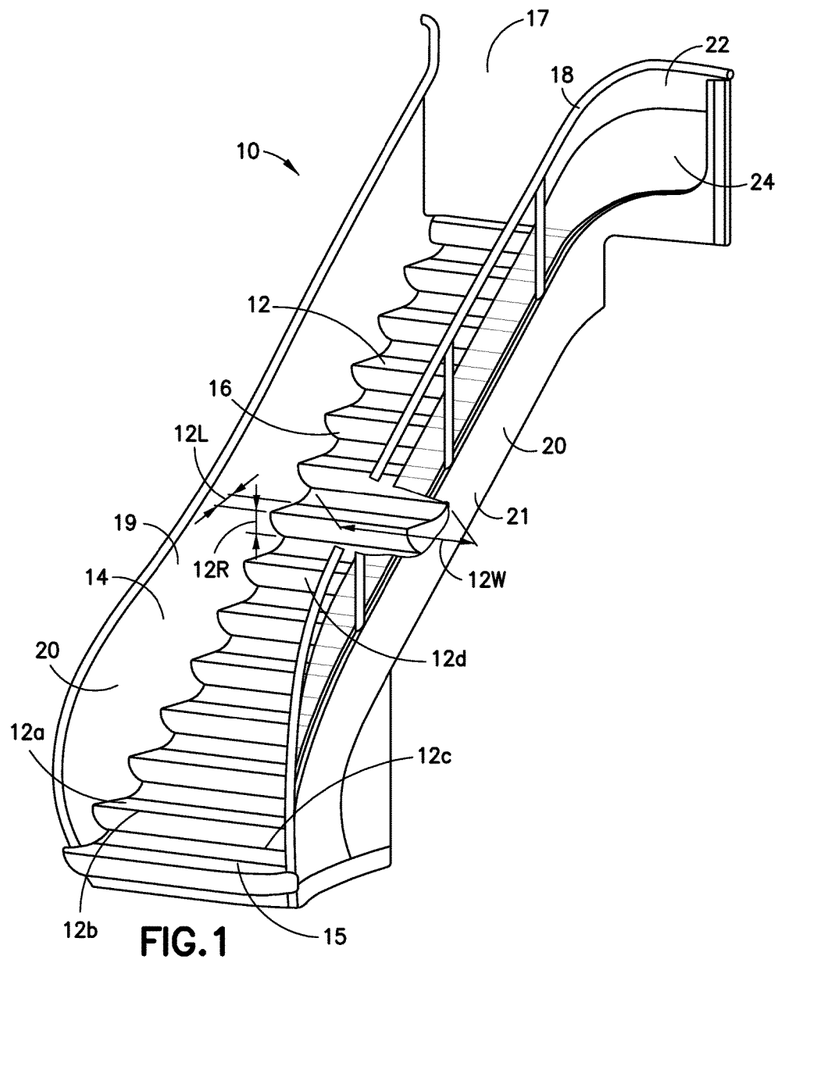
FIG. 1 is a diagram showing a perspective view of an exemplary aircraft staircase.

An exemplary staircase 10 employed in a Boeing 747-81 is shown in FIG. 1. The staircase 10 comprises a plurality of steps 12 between two side portions 14 forming a lower threshold 15 and an upper threshold 17. The steps 12 include kick strips 16 extending from a top landing surface 12a of the steps 12, around the top edge 12b of the steps 12 and down to the bottom edge 12c of the steps 12, and therefore cover the entire front surface 12d of the steps 12. The side portions 14 include a hand rail 18 that provides a comfortable place for a user to hold onto as they ascend or descend the steps 12 and a side wall 20. The steps 12 at the lower threshold 15 may be wider than the steps in the remaining part of the staircase 10. The width of the steps 12 is identified in FIG. 1 by arrows 12W. The length of the steps 12 is identified in FIG. 1 by arrows labeled 12L. The rise or height of the steps 12 is identified in FIG. 1 by arrows labeled 12R. The side portions 14 and hand rail 18 near the lower threshold 15 and the upper threshold 17 may be curved. One or both of the side portions 14 may also include an opening 22 for stylistic purposes, and a privacy screen 24 made from an opaque material comprising, for example, carbonite or plexiglass, positioned in at least a portion of the opening 22. The kick strips 16, the hand rail 18 and other parts of the staircase 10 are made from stainless steel or chrome, and are therefore cosmetically sensitive.

Figures 2A, 2B:
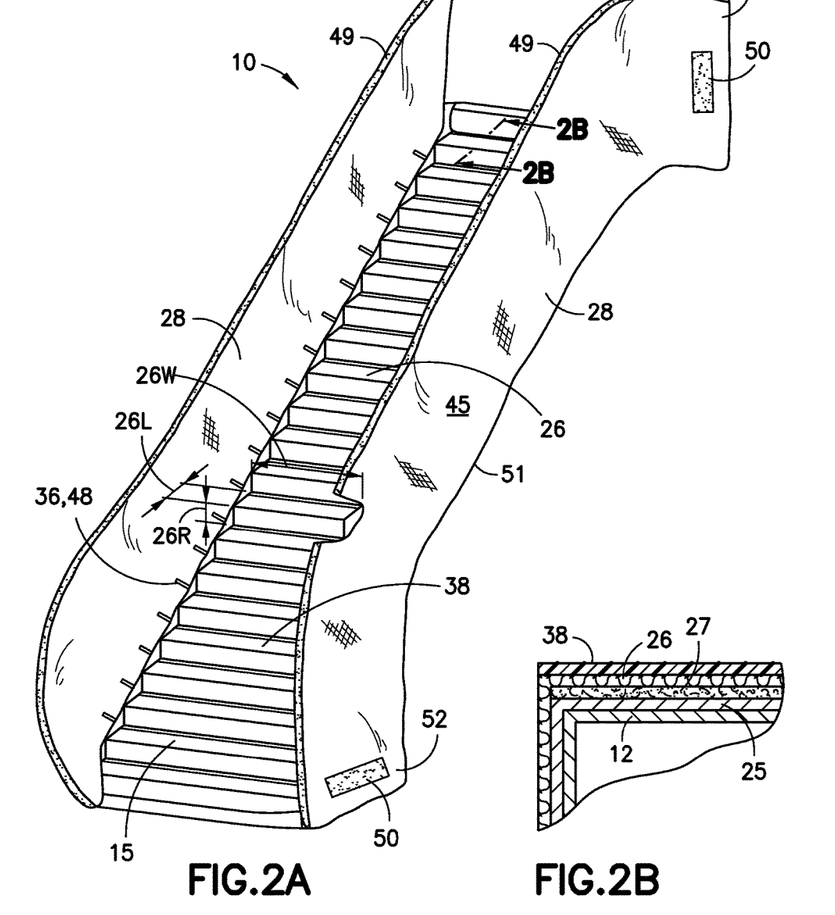
FIG. 2A is a diagram showing the staircase in FIG. 1 with a step cover and side covers installed on the staircase in accordance with this disclosure.
FIG. 2B is a diagram showing a cross-section view of a step in the covered staircase taken along the line 2B-2B in FIG. 2A.
Figure 3:
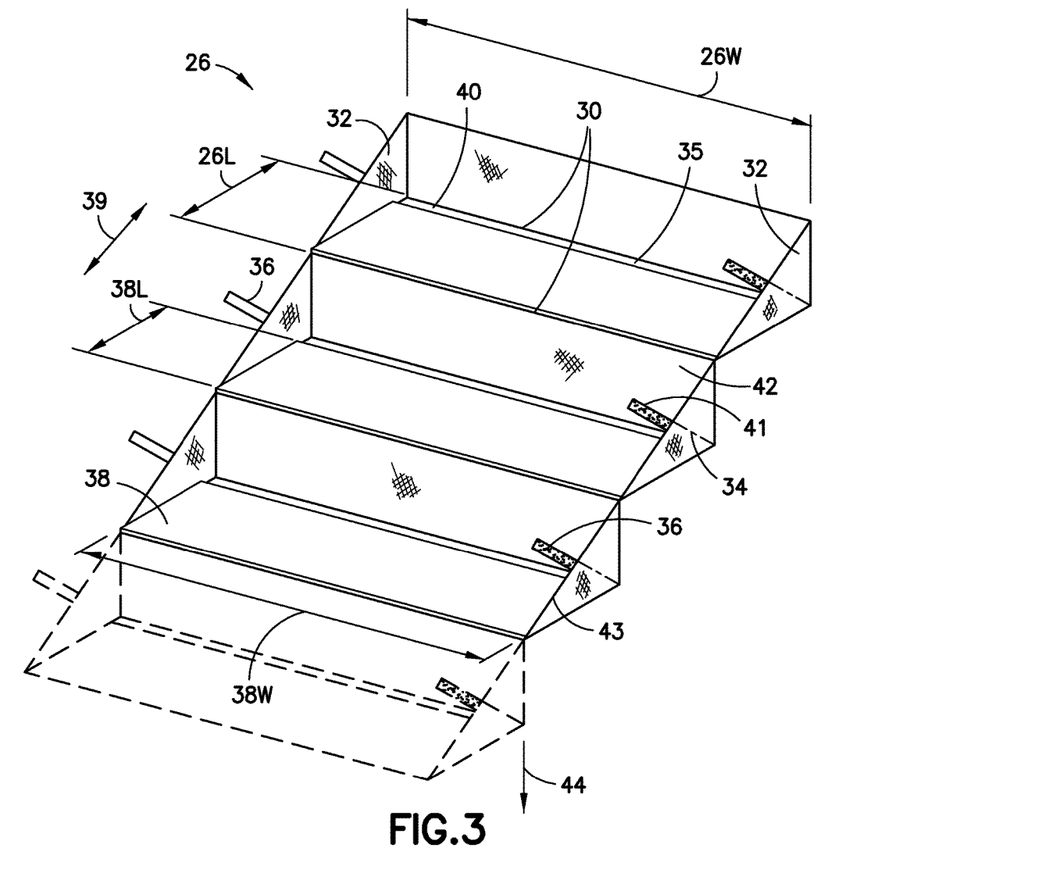
FIG. 3 is a diagram showing a step cover in an unfolded state.

FIG. 2A shows the staircase 10 (shown in FIG. 1) covered with a step cover 26 and side covers 28. A portion of the step cover 26 is shown in FIG. 3 prior to installation on the staircase 10 shown in FIG. 1. The step cover 26 is configured from a flexible material as described above, which has been cut and fabricated to a shape and size substantially corresponding to the shape and size of the staircase 10 which will be covered. The step cover 26 (FIG. 3), side covers 28 (FIG. 6) and the hood 62 (FIG. 8), described below, of the protection system 123 (FIG. 12) may be configured and used with staircases of any size and shape. The step cover 26 is cut to have a total length substantially equal to or greater than the sum of the length 12L and the rise 12R of all of the steps 12 in the staircase 10 shown in FIG. 1. The excess total length of the step cover 26 may be used to cover the lower threshold 15 and/or upper threshold 17. The step cover 26 may be manufactured as one piece long enough to cover all of the steps 12 as shown in FIG. 2A, or may be manufactured in two or more pieces with shorter lengths that are installed on the steps 12 separately. For example, the step cover 26 may be made in two equal length pieces. The step cover 26 has a width 26W substantially equal to a width 12W of the steps 12, and a length 26L and rise 26R substantially equal to the length 12L and rise 12R of the steps 12.

Referring to FIG. 3, the step cover 26 is configured to have an accordion pleat-type structure, with foldable score lines 30 that form the front and back edges of steps 35 in the step cover 26, and with foldable side panels 32 in the form of a triangle on both sides of steps 35. The score lines 30 extend across the width 26W of the step cover 26 and are spaced apart in the lengthwise direction (shown by arrow 39 in FIG. 3) of the step cover 26 by distances alternatively approximately equal to the length 12L and the rise 12R of steps 12 in the staircase 10 shown in FIG. 1.

Hook-and-loop or other types of fasteners 36 are affixed to the foldable side panels 32 by adhesive and/or stitching means, rivets or other suitable types of fastening means, such that at least a strip 41 of the fastener 36 extends beyond the top edge 43 of the side panels 32. The fasteners 36 are used to secure the step cover 26 to the side covers 28, as shown in FIG. 2. The side covers 28 are configured to have hook-and-loop or other types of fasteners 48, as described below, that correspond and affix to the fasteners 36 on the step cover 26.

Figure 4:
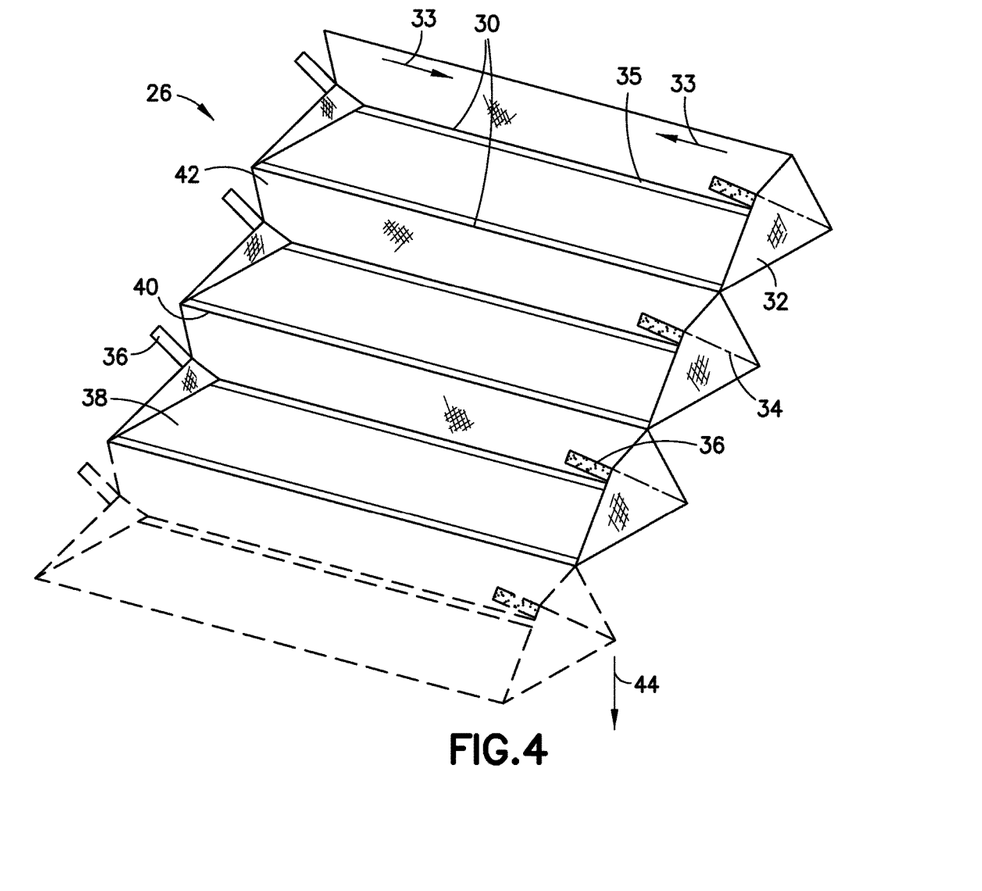
FIG. 4 is a diagram showing a step cover in a partially folded state.

Still referring to FIG. 3, the step cover 26 may also be configured with a non-skid material 38 on at least a portion of the step cover landing surfaces 40. Preferably, the non-skid material 38 covers the entire step cover landing surface 40. Alternatively, the non-skid material 38 may be configured to cover any portion of the step cover landing surface 40, or it may be applied in smaller strips that cover selected portions of the step cover landing surface 40, for example to reduce the weight of the non-skid material 38. Therefore, the non-skid material 38 has a width 38W substantially equal to the width 26W of the step cover landing surfaces 40 and a length 38L substantially equal to at least a part of the length 26L of the step cover landing surfaces 40 as shown in FIGS. 3 and 4. Any non-skid material 38 that provides slip resistance for users may be used. It may also be desired in the aircraft industry to use a non-skid material 38 that meets FAA standards, and may be recyclable. For example, a rubber, nylon or vinyl mat of the type that is used on the floor of an aircraft galley, or an elephant-hide material, may be used to provide a non-skid tread 38 on the step cover landing surfaces 40 of the step cover 26. One material that may be used as the non-skid material 38 is a vinyl mat with adhesive backing, available as BATIFLEX AV135 OPUS ADH MIAMI from GERFLOR, Bensenville, Ill. The non-skid material 38 is applied to the step cover 26 with adhesive and/or stitching, rivets or other suitable types of fastening means. For example, the non-skid material 38 may have an adhesive backing (not shown) that sticks to the step cover 26, and supplemental stitches (not shown) may also be used around the edges of the non-skid material 38.

Figure 5:
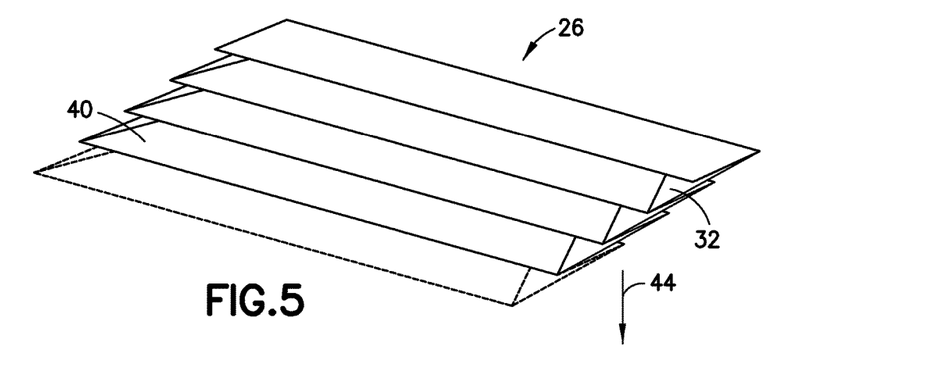
FIG. 5 is a diagram showing a step cover in a folded state.

Referring to FIGS. 4 and 5, the step cover 26 should be foldable to a substantially flat position (shown in FIG. 5) to provide for easy storage and transportation. The side panels 32 are pleated with score lines 34 to permit the side panels 32 to easily fold inward. When the side panels 32 are pushed inward, in the direction shown by the arrows 33 in FIG. 4, the side panels 32 fold inward 33 at the score lines 34 (or pleats) such that the fastener 36 on the side panels 32 folds inward 33 and the rise 42 of steps 35 in the step cover 26 folds downward onto the step cover landing surfaces 40. The folding action also causes all of the steps 35 in the step cover 26 to collapse in the direction shown by the arrow 44. With minimal effort, the step cover 26 is folded flat as shown in FIG. 5 when pushed together in the direction shown by the arrow 44. Because of the flexibility of the material used to make the step cover 26, once it is folded substantially flat as shown in FIG. 5, the step cover 26 may be folded further and provided with hook-and-loop or other types of fasteners to secure the step cover 26 in a folded state for storage or transportation.

Figure 6:
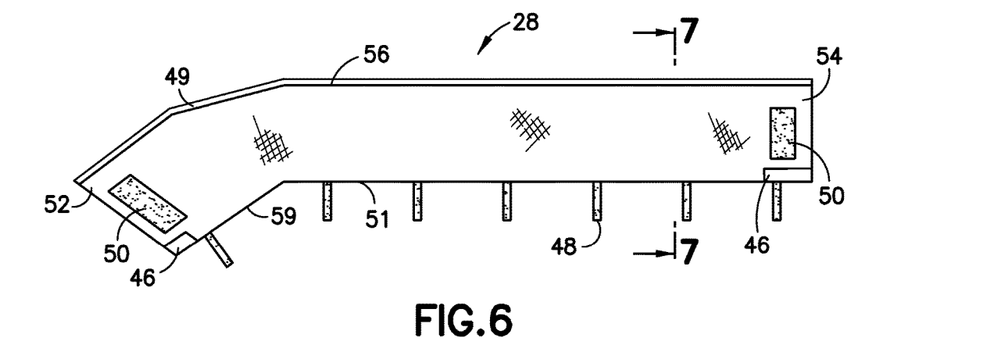
FIG. 6 is a diagram showing a side cover.
Figure 7:
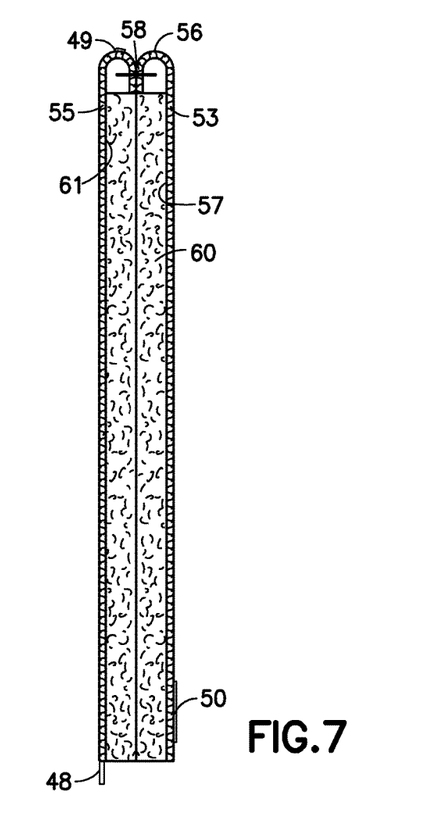
FIG. 7 is a diagram showing a cross-section view of a side cover taken along the line 7-7 of FIG. 6.

The side covers 28 are configured like an envelope as shown, for example, in FIGS. 6 and 7, which surround the side portions 14 of the staircase 10. At least all of the cosmetically sensitive parts of the side portions 14 should be covered, including the handrail 18, privacy screen 24 and preferably the entire side portions 14. The side covers 28 may be configured substantially identically for use in covering either of the side portions 14, such that they are interchangeable, or they may be configured for use on only one of the side portions 14. The side covers 28 are configured in a shape shown in FIG. 7 that substantially corresponds to the shape of the side portions 14 of the staircase 10. Hook-and-loop fasteners or other types of fasteners 48 are affixed to the side covers 28 to extend past a bottom edge 51 of the side cover 28 to facilitate fastening together with the fasteners 36 on the step cover 26 when installed as shown in FIG. 2. The side covers 28 may also have hook-and-loop or other types of fasteners 50 positioned on outer surfaces 45 of the side covers 28 proximate the lower end 52 and upper end 54, and fasteners 49 positioned along the top edge 56 of the side covers 28 to facilitate fastening of the hood 62, as described below.

Referring to FIG. 7, the side covers 28 are manufactured from two pieces 53, 55 of a flexible material as described above, which are rolled and affixed together to form the top edge 56 of the side covers 28. The two pieces 53, 55 may be affixed together with rivets, adhesives, stitching or other suitable means. The top edge 56 may be formed with or without a gusset 58. A padding material 60 is inserted and fastened to the interior surfaces 57, 61 of the two pieces 53, 55 of material that form the side covers 28 with rivets, adhesive, stitching or other suitable means, such that when installed on one of the side portions 14 of the staircase 10, the padding material 60 contacts the inner 19 and outer 21 surfaces of the side portion 14 to provide additional protection. Any type of lightweight padding material 60 that meets FAA standards may be used, such as foam or filler materials that may be used for aircraft seats. Any type of foam or filler material may be used that is suitable for the aircraft industry. An example filler material may be made from the pulp of the Kapok tree. An example foam material is "DAX Foam DAX 90" available from Skandia, Inc., Davis Junction, Ill. In FIG. 7, the two pieces of flexible material 53, 55 are rolled at the top edge 56 but do not extend between the padding materials 60 fastened to the flexible materials 53, 55. One or both of the two pieces of flexible material 53, 55 may also extend all or part of the way down between the padding material 60 attached to inner surfaces 57, 61 of the flexible material 53, 55.

A weight 46 may be added to the side covers 28 proximate the bottom edge 59 of the side covers 28, with adhesive or additional material stitched around the weight 46 or the weight 46 may be fastened to the side covers with hook-and-loop or other type of fasteners as shown in FIG. 6, to help provide a snug fit of the side covers 28 over the side portions 14 and to assist with maintaining the side covers 28 in the correct position over the side portions 14. The weight 46 may be positioned at the lower end 52 and upper end 54 of the side cover 28 to reduce the weight of the side cover 28 or anywhere else along the bottom edge 59.

Figure 8:
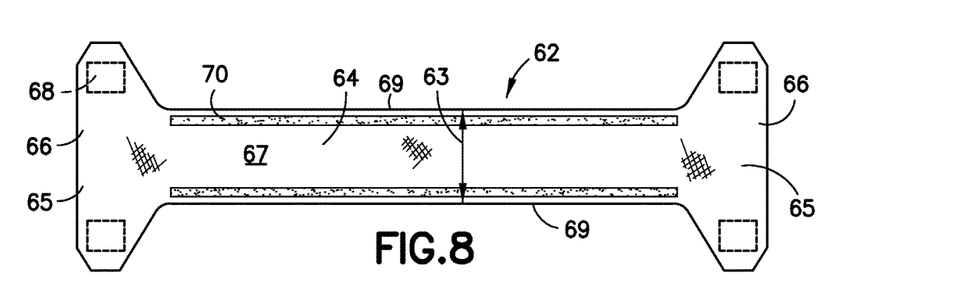
FIG. 8 is a diagram showing a hood in a flat unfolded state.

There are certain situations when access to the staircase 10 should be temporarily blocked, such as during installation of the staircase into an aircraft. Referring to FIG. 8, the protective system includes a hood 62 made from a flexible material as described above that is configured to cover the entire staircase 10 and temporarily block access to the staircase 10. The hood 62 has a dogbone shape with a central portion 64 having a width 63 that is larger than the width 12W of the steps 12 and two enlarged flaps 65 at the end portions 66. Hook-and-loop or other types of fasteners 68 are affixed by adhesive and/or stitching, rivets or other suitable means to an interior surface 67 of the hood 62 on the enlarged flaps 65 at the end portions 66; and hook-and-loop or other types of fasteners 70 are affixed to the hood 62 proximate the edges 69 of the central portion 64, such that the hood 62 may be removably coupled to the fasteners 49 and 50 on the side covers 28 (shown in FIGS. 2 and 6).

Figure 9:
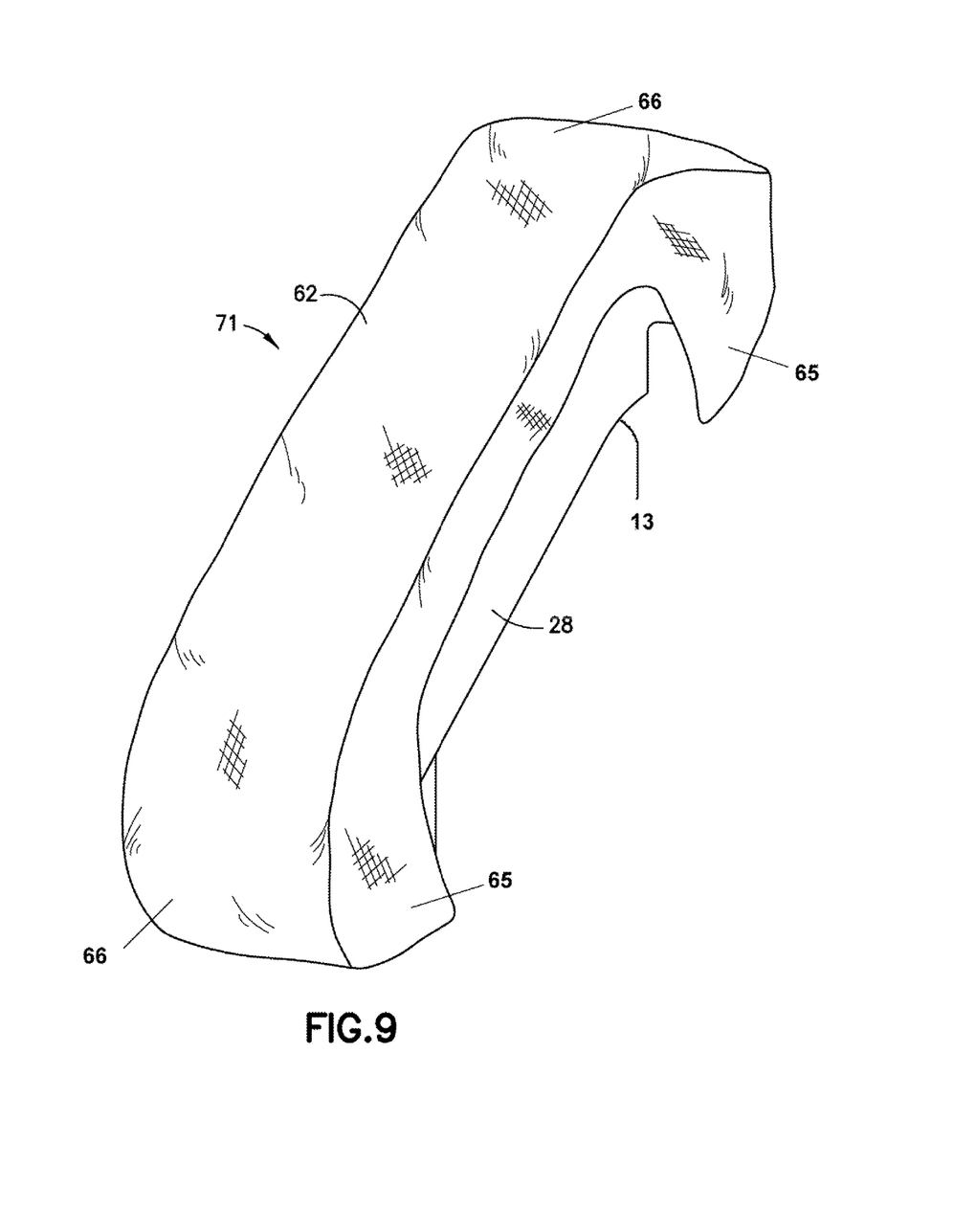
FIG. 9 is a diagram showing the staircase in FIG. 2 with a hood installed on the staircase in accordance with this disclosure.

The hood 62 is shown in FIG. 9 installed on the staircase 10 to temporarily block access to the staircase 10. The hood 62 drapes over the side portions 14, which are covered by side covers 28. The fasteners 70 in the central portion 64 of the hood 62 (shown in FIG. 8) are removably coupled to the fasteners 49 on the top edge 56 of the side covers 28 (shown in FIGS. 2 and 6). The fasteners 68 at the end portions 66 of the hood 62 (shown in FIG. 8) are removably coupled to fasteners 50 positioned proximate the lower end 52 and upper end 54 of the side cover 28 (shown in FIGS. 2 and 6). The size and shape of the hood 62, and the size, shape and location of the fasteners 68 and 70, may be modified to accommodate staircases having different widths, lengths, pitches, and other shapes, provided that the hood 62 fits snugly over the staircase 10, and does not sag. The hood 62 may also be secured to the staircase 10 without the use of the step cover 26 or side covers 28 by draping the hood 62 over the hand rails 18 on side portions 14. The hood 62 may be wrapped around the hand rails 18 and through the opening 22 in the side portion 14, and then removably coupled to itself. Hook-and-loop or other types of fasteners may be provided for removably coupling the hood 62 to itself.

For additional protection, the privacy screens 24 and the hand rails 18 may be removably coated with an electrostatic sheathing (not shown) made from foam, plastic or other materials. The hand-rails may also be wrapped with a protective tape (not shown), such as plumbing tape, along the entire hand-rail surface.

Figure 10:
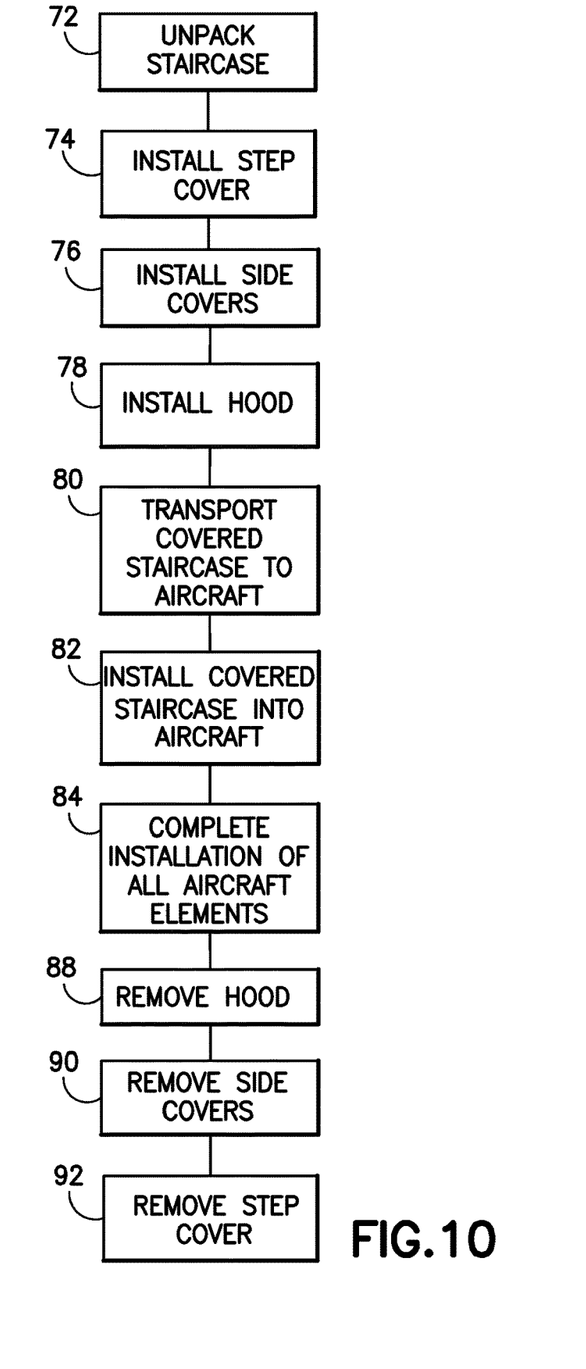
FIG. 10 is a flow diagram showing a process for protecting a staircase.

A method of protecting an aircraft staircase, like the staircase 10 shown in FIG. 1 for example, is depicted in FIG. 10. The staircase 10 is typically manufactured by a third party supplier and shipped to an aircraft manufacturer (step 108 in FIG. 11) In method step 72 of FIG. 10, the staircase 10 is unpacked or unloaded from its shipping crate. The staircase 10 may be unloaded in a storage area or pre-installation area where the step cover 26, side covers 28 and hood 62 of the protection system 123 are installed onto the staircase 10 as shown in FIGS. 2 and 9. Alternatively, the staircase supplier/manufacturer may install the protection system 123 prior to shipping the staircase 10 to the aircraft manufacturer. The hood 62 may also be installed onto the staircase 10 without the step cover 26 and side cover 28 as described above.

In method step 74, the step cover 26 is installed onto the steps 12 of the staircase 10 as shown in FIG. 2 and described above. Padding may be used under the step cover 26 (i.e., between the step cover 26 and one or more step cover landing surfaces 40) to provide additional protection. It may be useful to utilize padding on the bottom step 12 at the lower threshold 15 to provide additional kick protection.

To assist with removing the step cover 26 from the staircase 10, a rhino hide, elephant hide or other type of latex saturated protection material 25 may be, but is not required to be, applied to the steps 12 before the step cover 26 is installed on the steps 12 as shown in FIG. 2B. The rhino hide or elephant hide protection material 25 may have a light adhesive back to lightly secure the protection material 25 to the steps 12, and permit easy removal of the protection material 25. An example of the type of protection material 25 that may be used is Protex 10v available from Aerotape, Orlando, Fla.

The step cover 26 should first be unfolded by applying force to the cover in the direction opposite the arrows 33 and 44 shown in FIGS. 4 and 5, to achieve the unfolded step cover 26 shown in FIG. 3. The step cover 26 is removably coupled to the rhino hide or elephant hide material with hook-and-loop type fasteners 27 discreetly placed on the back surface of the step cover 26 and top surface of the rhino hide or elephant hide protection material 25 (as shown in FIG. 2B), or directly on the steps 12 if no rhino hide protection material 25 is used, such that the step cover landing surfaces 40 in the step cover 26 align with the landing surfaces 12a of the steps 12 in the staircase 10. Fasteners 27 may be placed at discreet locations on step cover 26, for example proximate the lower threshold 15 and upper threshold 17. The step cover 26 may also be configured with additional material extending beyond the lower threshold 15 and upper threshold 17. The additional material may be weighted to prevent the material from bunching up.

In method step 76, the side covers 28 are installed over the hand rails 18 and side walls 20 of the side portions 14 of the staircase 10. After the side covers 28 are unfolded, the side covers 28 slip over the hand rails 18 and extend down to the steps 12, with the padding material 60 positioned on the inner 19 and outer 21 surfaces of the side portions 14 between the flexible outer material 53, 55 as shown in FIGS. 2 and 7. The fasteners 48 on the side covers 28 are removably coupled to the fasteners 36 on the side panels 32 of the step cover 26 as shown in FIG. 2. This prevents the side cover 28 from sliding down the side portions 14. Ties, fasteners or boning may also be used to assist in preventing the side covers 28 from slipping down the side portions 14.

In method step 78, the hood 62 is installed over the entire staircase 10 to temporarily block access to the steps 12. As described above, the hood 62 may be installed either by itself or in combination with the step cover 26 and side covers 28. When installed with the side covers 28, the hood 62 is unfolded and placed over the top edges 56 of the side cover 28. The fasteners 70 proximate the edges 69 of the central portion 64 of the hood 62 are removably coupled to the fasteners 49 on the top edge 56 of the side covers 28. The end portions 66 of the hood 62 are wrapped around the side portions 14 of the staircase at the lower threshold 15 and upper threshold 17, and removably coupled to the ends of the side cover 28 via the fasteners 50 on the side cover 28 and fasteners 68 on the hood, shown in FIG. 8. When installed by itself, the hood 62 is unfolded and placed over the hand rails 18 of the staircase 10. The hood 62 may be wrapped around the hand rails 18 and through the opening 22 in the side portion 14, and then removably coupled to itself. Hook-and-loop or other types of fasteners may be provided for removably coupling the hood 62 to itself. Referring to FIG. 9, the enlarged flaps 65 at the ends 66 of the hood 62 may also be wrapped around the bottom 13 of the staircase 10 and secured to one another underneath the staircase 10.

Figure 11:
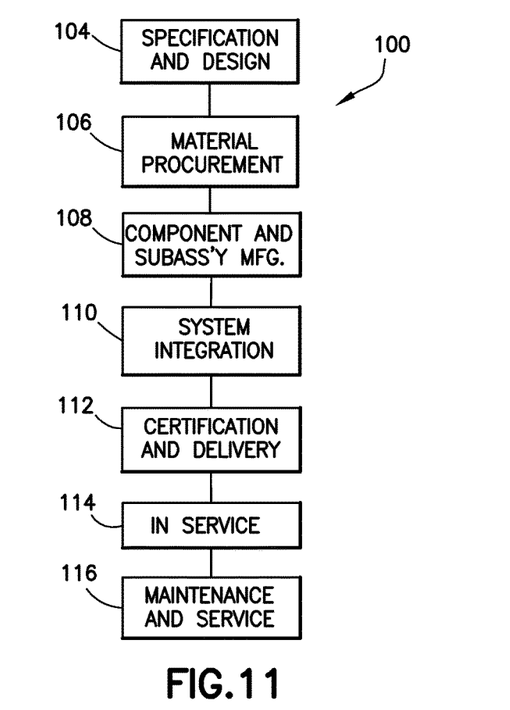
FIG. 11 is a flow diagram of an aircraft production and service methodology.
Figure 12:
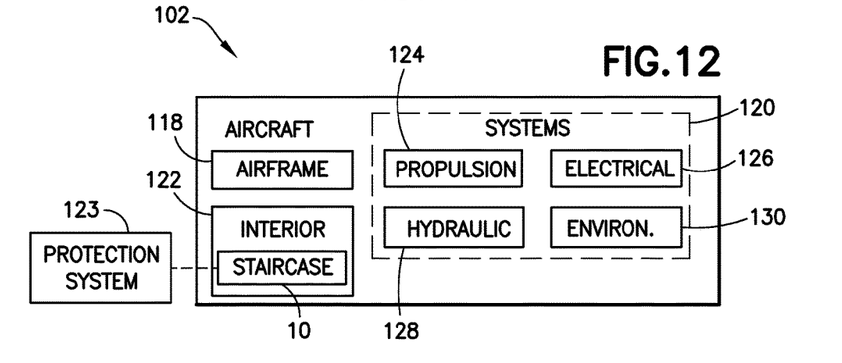
FIG. 12 is a block diagram of an aircraft.

In method step 80, the covered staircase 71, as shown in FIG. 9, is transported to an aircraft 102 (FIG. 12) and in method step 82, the covered staircase 71 is installed into an interior 122 of the aircraft 102 (FIG. 12). In method step 84, the build of the aircraft 102 is continued until completion. It is preferred that the step cover 26, the side covers 28 and the hood 62 of the protection system 123 remain installed on the staircase 10 during the entire build process, and is not removed until delivery to the customer 112 (FIG. 11). However, if necessary, the hood 62 may be temporarily removed and reinstalled in order to permit mechanics, pilots or other maintenance people to obtain access to the steps 12 to move from one deck to another, without disturbing the step cover 26 and the side covers 28.

In method steps 86, 88 and 90, the protection system 123 is removed from the staircase by removing the hood 62, removing the side covers 28 and removing the step cover 26. The protection material 25 between the step cover 26 and the steps 12, if used, should also be removed. The hood 62, the side covers 28 and the step cover 26 may be readily folded and secured in a folded position for storage and further use as described above. Additional fasteners may be provided to secure the covers in a folded position and to secure all of the elements in the protection system 123 in one folded bundle to provide for ease of transportation and storage. Alternatively, materials may be used that are inexpensive enough to permit the system to be disposed of and/or recycled after use.

This disclosure may be described in the context of an aircraft manufacturing and service method 100 as shown in FIG. 11 and an aircraft 102 as shown in FIG. 12. During pre-production, exemplary method 100 may include specification and design 104 of the aircraft 102 and material procurement 106. During production, component and sub-assembly manufacturing 108, a staircase 10 may be shipped from a staircase manufacturer to an aircraft 102 manufacturer, and system integration 110 of the aircraft 102 takes place, including installing the staircase 10 into the aircraft 102. Thereafter, the aircraft 102 may go through certification and delivery 112 in order to be placed in service 114. The protection system 123 disclosed herein should be removed by the aircraft manufacturer prior to delivery 112 to the customer, but can be removed and stored for later use by the customer/airline. While in service by a customer, the aircraft 102 is scheduled for routine maintenance and service 116 (which may also include modification, reconfiguration, refurbishment, and so on). The protection system 123 and method may be used by the customer/airline or by after market maintenance firms to cover a staircase 10 during routine maintenance and service 116, in addition to the production, component and subassembly manufacturing processes 108.

The processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 102 produced by exemplary method 100 may include an airframe 118 with a plurality of systems 120 and an interior 122, which includes a staircase 10. A protection system as disclosed herein 123 is also included for use during one or more of the stages of the production and service method 100 Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus, method, or a combination thereof may be utilized during the production stages 108 and 110, for example, by substantially expediting assembly of or reducing the cost of an aircraft 102. Similarly, one or more of apparatus, method, or a combination thereof may be utilized while the aircraft 102 is in service, for example and without limitation, to maintenance and service 116.

While the disclosure has been described with reference to certain examples, such examples are for purposes of illustration and not limitation. It will be understood by those skilled in the art that various changes may be made and equivalents may be substituted for elements thereof without departing from the scope of the disclosed concepts. For example, and without limitation, a wide variety of materials may be used to form the protection system within the scope of this disclosure, and the size, shape and location of the fasteners may be adjusted or reconfigured depending on the size, shape and configuration of the staircase to be covered. In addition, many modifications may be made to adapt a particular situation to the teachings herein without departing from the essential scope thereof. Therefore it is intended that the claims not be limited to the particular examples disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

I claim:

1. A system for protecting an aircraft staircase having a plurality of steps positioned between two sides, the system comprising:
    a step cover configured to be removably coupled to a top landing surface of each of the plurality of steps;
    a first side cover configured to drape over a first one of the sides and be removably coupled to the step cover;
    a second side cover configured to drape over a second one of the sides and be removably coupled to the step cover; and
    a hood configured to be removably coupled to the first side cover and the second side cover to cover the staircase; the hood, the step cover, the first side cover and the second side cover comprising a flexible material.

2. The system of claim 1, wherein the step cover, the first side cover, the second side cover and the hood comprise one or more fasteners coupled thereto and configured to facilitate removable coupling of the step cover and the hood to the first side cover and the second side cover.

3. The system of claim 1, wherein the step cover has a width substantially equal to a width of the plurality of steps and a total length substantially equal to a sum of a length and a rise of all of the plurality of steps in the staircase.

4. The system of claim 3, wherein the step cover comprises score lines extending across the width of the step cover and spaced apart in a lengthwise direction of the step cover by distances equal to the length and the rise of the plurality of steps.

5. The system of claim 3, wherein the length of each step in the step cover represents a step cover landing surface, the system further comprising a non-skid material positioned on the step cover landing surface.

6. The system of claim 5, wherein the non-skid material has a width equal to the width of the plurality of steps and a length equal to at least a part of the length of the plurality of steps.

7. The system of claim 1, wherein the first side cover is configured to encapsulate the first one of the sides and the second side cover is configured to encapsulate the second one of the sides.

8. The system of claim 1, wherein the first side cover and the second side cover comprise two pieces of the flexible material joined together along one edge to form a top edge of the first side cover and the second side cover and a padding material positioned on an interior surface of each of the two pieces.

9. The system of claim 1, wherein the hood comprises hook-and-loop fasteners positioned proximate edges of the hood for removable coupling to hook-and-loop fasteners positioned along a top edge of the first side cover and the second side cover.

10. A method of protecting an aircraft staircase having a plurality of steps positioned between two sides, the method comprising:
    removably coupling a flexible step cover to a top landing surface of each of the plurality of steps;
    draping a flexible first side cover over a first one of the sides and removably coupling the first side cover to the flexible step cover;
    draping a flexible second side cover over a second one of the sides and removably coupling the second side cover to the flexible step cover; and
    draping a hood over the staircase and removably coupling the hood to the first side cover and the second side cover.

11. The method of claim 10, further comprising configuring the flexible step cover to have a width substantially equal to a width of the steps and a total length substantially equal to the sum of a length and a rise of all of the steps in the staircase.

12. The method of claim 11, further comprising configuring the step cover to have score lines extending across the width of the step cover and spaced apart in the lengthwise direction of the step cover by distances alternatively equal to the length and the rise of steps, and folding the step cover along the score lines to form alternating step sections and rise sections.

13. The method of claim 12, further comprising positioning a non-skid material on the step sections.

14. The method of claim 13, further comprising configuring the non-skid material to have a width equal to the width of the steps and a length equal to at least a part of the length of the steps.

15. The method of claim 10, wherein draping the first side cover comprises encapsulating the first one of the sides and draping the second side cover comprises encapsulating the second one of the sides.

16. A method of protecting an aircraft staircase having a plurality of steps positioned between two sides, the sides having a handrail positioned on a top portion of the sides, the method comprising draping a hood over the staircase and removably coupling the hood around the handrail on the sides and fastening the hood to itself to temporarily block access to the staircase.

\* \* \* \* \*